United States Patent [19]
Keilert et al.

[11] Patent Number: 5,268,132
[45] Date of Patent: Dec. 7, 1993

[54] PROCESS AND DEVICE FOR DRAWING OFF AND BLOCKING OFF A MELT

[75] Inventors: Jürgen Keilert, Kleinwallstadt; Alfred Nogossek, Würzburg; Harald Zang, Kleinostheim, all of Fed. Rep. of Germany

[73] Assignee: Automatik Apparate-Maschinenbau GmbH, Fed. Rep. of Germany

[21] Appl. No.: 867,193

[22] PCT Filed: Dec. 19, 1990

[86] PCT No.: PCT/EP90/02246

§ 371 Date: Aug. 14, 1992

§ 102(e) Date: Aug. 14, 1992

[87] PCT Pub. No.: WO91/09997

PCT Pub. Date: Jul. 11, 1991

[30] Foreign Application Priority Data

Jan. 5, 1990 [DE] Fed. Rep. of Germany ....... 4000218

[51] Int. Cl.$^5$ ............................................. B29C 47/86
[52] U.S. Cl. ...................................... 264/169; 264/39; 264/176.1; 425/183; 425/185; 425/192 S; 425/215; 425/378.2; 425/464
[58] Field of Search .................. 264/169, 39, 176.1; 425/183, 185, 464, 215, 463, 191, 192 S, 378.2, 379.1

[56] References Cited

U.S. PATENT DOCUMENTS

| 3,071,808 | 1/1963 | Mackinnon | 264/39 |
| 3,436,789 | 4/1969 | Hays | 264/39 |
| 3,471,017 | 10/1969 | Kalman | 264/176.1 |
| 3,651,194 | 3/1972 | Bohrer | 264/39 |
| 3,947,202 | 3/1976 | Göller et al. | 425/185 |
| 4,255,109 | 3/1981 | Emmerich et al. | 264/39 |
| 4,808,355 | 2/1989 | Kamiyama et al. | 264/39 |

FOREIGN PATENT DOCUMENTS

| 2456968 | 6/1975 | Fed. Rep. of Germany | 264/169 |
| 61-55207 | 3/1986 | Japan | 264/39 |

Primary Examiner—Jeffery Thurlow
Attorney, Agent, or Firm—Banner, Birch, McKie & Beckett

[57] ABSTRACT

Process and device for drawing off and blocking off a melt, especially of plastic material, with a heatable melter (1) fitted with a blocking valve (3) acting as a melt distributor from which the melt flows into a nozzle plate (10) which divides the melt by means of nozzles (14) into a plurality of threads, whereby the temperature of the melter and nozzle plate is regulated separately and the blocking valve is closed to block the melt off and the nozzle plate is tightly closed off by a cover (18). To draw off the melt with the blocking valve open, the temperature of the melter and the nozzle plate is kept substantially at the same level and to block off the melt with the blocking valve closed the nozzle plate is taken to a temperature just above the solidification temperature of the melt material. With the closure of the blocking valve the cover, which is cooled to a temperature considerably below the solidification temperature, is laid on the nozzle plate into which residual melt flows and seals off the nozzle apertures in the solidified state.

4 Claims, 1 Drawing Sheet

PROCESS AND DEVICE FOR DRAWING OFF AND BLOCKING OFF A MELT

BACKGROUND AND SUMMARY OF THE INVENTION

The invention relates to a process and a device for drawing off and blocking off a melt, in particular of plastic material, with a heatable melter, which is provided with a blocking valve and acts as a melt distributor and from which the melt flows into a nozzle plate, which divides the melt by means of nozzles into a plurality of strands, whereby the temperature of the melter and nozzle plate is regulated separately and the blocking valve is closed to block off the melt, and the nozzle plate is tightly closed off by a cover.

It is necessary to seal off the melt at the nozzle apertures if the melt flow is blocked off, in order to prevent the air from penetrating from the nozzle apertures; said air can trigger an oxidation process of the melt, which leads to an undesired chemical change in the melt material. To date the cover used for this closure was usually screwed to the nozzle plate. It is thereby necessary that the cover rests with significant pressure on the nozzle plate, in order to obtain the requisite sealing effect. It has turned out that apparently owing to the existing temperature differential a distortion of the cover is inevitable, a feature that results in the nozzle apertures being sealed only incompletely and thus the air having access.

The object of the invention is to improve the seal of the nozzle apertures in the case of the melt flow being blocked off. According to invention this problem is solved in that to draw off the melt with the blocking valve open, the temperature of the melter and the nozzle plate is kept substantially at the same level, and to block off the melt with the blocking valve closed the nozzle plate is lowered to a temperature just above the solidification temperature, and with the closure of the blocking valve the cover cooled to a temperature considerably below the solidification temperature is laid on the nozzle plate into which a residual melt flows and seals off the nozzle apertures in the solidified state.

The temperature in the melter and the nozzle plate that is kept at the same level while drawing off the melt is changed in such a manner when blocking off the melt flow that, while the temperature in the melter is kept unmodified, the temperature level in the nozzle plate is lowered, and in particular so far that in the nozzle plate a temperature just above the solidification temperature of the melt material prevails. If then owing to the considerable cooling of the cover, the cover accommodating the melt material converts the melt material into the solidified state, the solidified material can seal off the nozzle apertures, and in particular also permanently, since owing to the lowering of the temperature in the nozzle plate, the solidified melt material held by the cover cannot be melted again from that direction. The result is thus, owing to the solidified melt material a reliable sealing of the nozzle apertures, thus reliably preventing the air from penetrating and thus oxygen into the region of the melt. This kind of sealing of the nozzle plate also allows the cover to be laid with less precision on the nozzle plate, without requiring a specific pressure to this end, since the necessary seal is brought about not by the cover itself but, as said, by the solidified melt material.

The device to effect the process described above is based on a heatable melter, which is provided with a blocking valve and which is acting as a melt distributor and to which is attached a nozzle plate, which divides the melt into a plurality of strands by means of nozzles and which can be sealed off with a cover. This device is designed in such an advantageous manner that the nozzle plate and the cover are provided with one separate and individually controllable heating or cooling system each, whereby between the melter and the nozzle plate a temperature insulating layer, which connects sealingly melter and nozzle plate, is installed, and the cover exhibits a recess, extending over the nozzle apertures, as the collecting basin for the melt cooled by the cover.

The recess in the cover, which serves as the collecting basin for the melt cooled by the cover, can be relatively flat, so that a relatively thin layer is formed by the solidified melt material in the recess. This is totally adequate for the sealing effect. In so doing, the temperature insulating layer provided between melter and nozzle plate provides that the temperature prevailing in the melter has no effect on the temperature in the nozzle plate that is cooled in contrast.

If the melt is to be drawn off again from the device, the cover is removed from the nozzle plate. Depending on the melt material used, the cover can take along in its recess the solidified melt layer. In this case the cover can be provided with a ram penetrating the cover in the region of its recess, in order to push out the solidified melt material. With the cover removed, the ram is pushed forward, whereby the solidified melt layer drops out of the recess of the cover.

The cover can be affixed or removed by hand, but it is also possible to carry out this procedure, e.g., with a swivel or slide mechanism. In so doing, it is especially advantageous that the cover does not constitute a risk for the operating personnel on account of its cooling.

BRIEF DESCRIPTION OF THE DRAWINGS

The figures show embodiments of the invention.

DETAILED DESCRIPTION OF THE PREFERRED EMBODIMENTS

Figure 1:
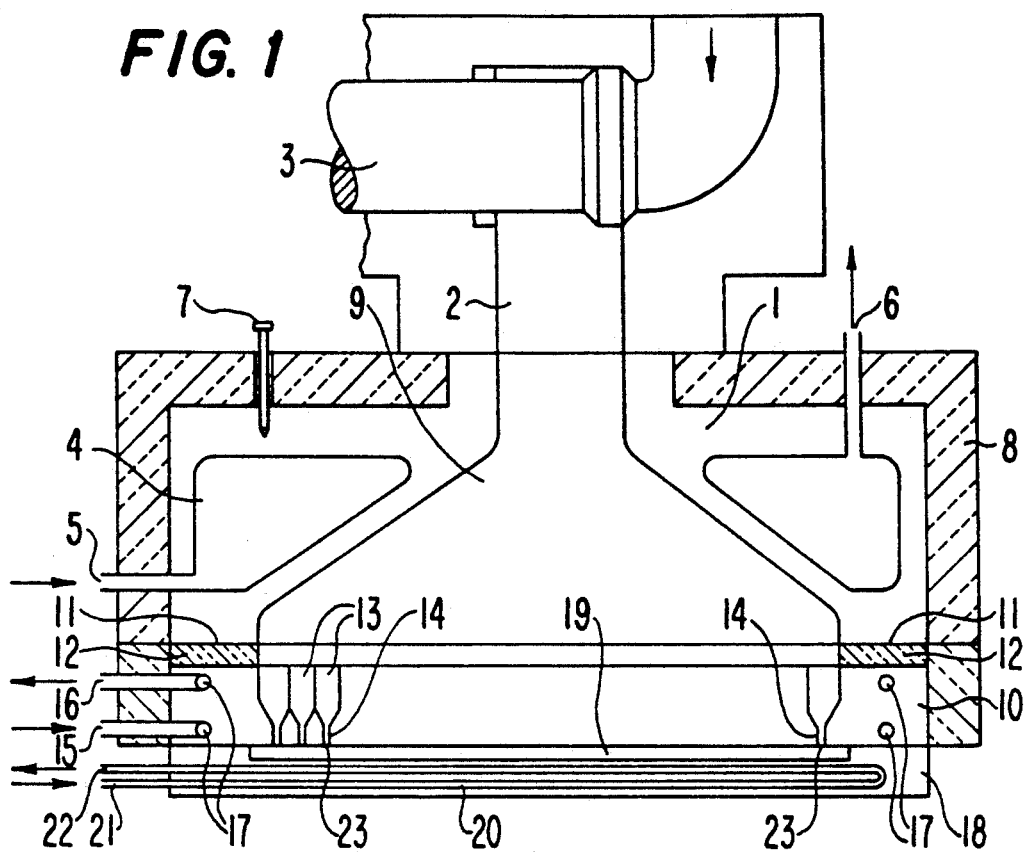
FIG. 1 is in principle a sectional view of a melter with nozzle plate and cover laid on the nozzle plate.

FIG. 1 shows a device to draw off and block off a melt, in particular of plastic material, with a melter 1, to which is fed plastic melt by means of a feed line 2. The blocking valve 3 is laid into the feed line 2. The melter 1 is enveloped by a heating chamber 4, which encloses said melter like a ring and into which a heating liquid flows through the inlet 5 and flow out of said heating chamber through the outlet 6. The temperature of the melter is measured continuously by means of a temperature probe 7. The melter 1 is enveloped by an insulating casing 8, shown in the drawing with cross hatching, for the purpose of preventing heat loss. The melter has the interior 9, which is filled by melt and which expands correspondingly in the direction of the nozzle plate 10 to be attached.

The temperature insulating layer 12, which connects sealing the face 11 of the melter with the side of the nozzle plate 10 concerned, is affixed to the flat face 11 of the melter 1. The temperature insulating layer serves to prevent a direct heat transfer from the melter 1 to the nozzle plate 10.

The nozzle plate 10, which is penetrated by channels 13, which terminate in the nozzles 14, follows the temperature insulating layer 12. If the melt is drawn off, the melt flows through the inner chamber 9 of the melter 1 through the channel 13 and exits on the bottom side of the nozzle plate 10 out of the nozzles 14. The nozzle plate 10 is connected by means of inflow 15 and outflow 16 to a heating and cooling medium stream for which channels extending in a ring around the nozzle plate 10 are provided. By means of the medium flowing through the channels 17, the nozzle plate 10 is kept at the desired temperature level.

On the bottom side of the nozzle plate 10 rests the cover 18, which extends with its recess 19 over all nozzles 14. Thus, the drawing in FIG. 1 shows the operating phase in which the melt stream is blocked off. The cover 18 exhibits the channel 20, which extends over the entire length of said cover and which is attached to a coolant stream by means of the inlet 21 in the outlet 22. With the aid of this coolant the cover 18 can be raised to a temperature considerably below the temperature of the nozzle plate 10.

According to the process step described in the introductory part, the cover 18 has been laid on the nozzle plate 10 together with the closure of the blocking valve 3, so that only a residual melt can penetrate out of the inner chamber 9 of the melter 1 into the recess 19. This residual melt solidifies owing to the considerable cooling of the cover 18 relative to the nozzle plate 10, so that a cake of solidified melt is formed that fills substantially the space of the recess 19 and thus seals reliably and air tight the nozzle apertures 23. So that at this stage the cover 18 does not receive too much heat from the nozzle plate 10, said nozzle plate is lowered to a temperature just above the solidification temperature of the melt material. Thus, the melt material remaining within the channels 13 and the nozzles 14 cannot solidify, a feature that would significantly delay a later process of drawing off the melt, since to this end the channels 13 and the nozzles 14 have to be cleaned first of the solidified melt material. The temperature level in the melter 1 remains virtually unmodified with respect to the process for drawing off the melt.

Figure 2:
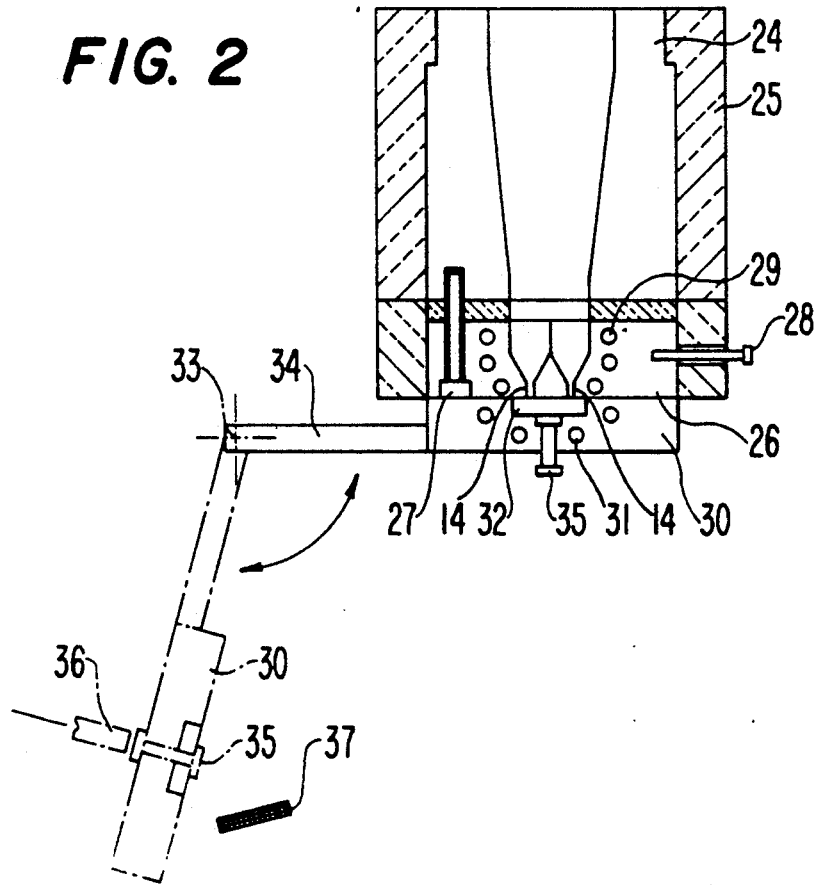
FIG. 2 is a modified design with a cover that can be swivelled with respect to the nozzle plate.

FIG. 2 is a modified design of the melter of FIG. 1, and in particular a device with two rows of nozzles 14. The melter 24 is elongated here in the longitudinal direction and protected against temperature loss by the insulating casing 25. The nozzle plate 26 is screwed here by means of screws 27 to the wall of the melter 24. For reasons relating to simplifying the drawing, only one screw 27 is shown. The temperature of the nozzle plate 26 is measured by the temperature probe 28. The nozzle plate 26 is provided with channels 29 and cover 30 with channels 31, which provide in the manner described above for a suitable temperature adjustment of the nozzle plate 26 and cover 30. The heating of the melter 24 is omitted here for the sake of simplifying the drawing.

The cover 30 has the recess, which is incorporated below the nozzles 14 and serves here in the embodiment of FIG. 1 the purpose of accommodating a residual melt material with the melt flow blocked off; then the melt cake solidifying in the recess 32 seals reliably the nozzles 14.

The Figure shows how the cover 30 is brought to the nozzle plate 26. This is done by means of a hinge 33, in which the arm 34 is positioned to which the nozzle plate 30 is attached. The ram 35, which serves the purpose of pushing out a cake of solidified melt material located in the recess 32, is embedded in the cover 30. This is shown in FIG. 2 in the region of the dashed-dotted drawing of the cover 30, which shows the position of the cover 30 swivelled away from the nozzle plate 26. The ram 35 is drawn here in a pushed out position, caused by the pin 36. In so doing, the ram 35 pushes the melt cake 37 out of recess.

It must also be pointed out that the heating or cooling channels shown in FIGS. 1 and 2, the latter in the region of the cover 18 or 30, can also be replaced by any arbitrary heating medium, e.g. an electric heater. For the purpose of cooling, the heater must then be completely switched off, to which end there is also optionally a base cooling with a cooling medium.

We claim:

1. Process for drawing off and blocking off a melt, in particular of plastic material, with a heatable melter (1, 24), which is provided with a blocking valve (3) and acts as a melt distributor and from which the melt flows into a nozzle plate (10, 26), which divides the melt by means of nozzles (14) into a plurality of strands, whereby the temperature of the melter (1, 24) and nozzle plate (10, 26) are each regulated separately, the blocking valve (3) is closable to block off the melt and the nozzle plate (10, 26) is adapted to be tightly closed off by a removable cover (18, 30), wherein to draw off the melt with the blocking valve (3) open, the temperature of the melter (1, 24) and the nozzle plate (10, 26) are kept at substantially the same level with respect to each other, and to block off the melt with the blocking valve (3) closed, the nozzle plate (10, 26) is lowered to a temperature just above the solidification temperature of the melt, and with the closure of the blocking valve (3) the cover (18, 30) cooled to a temperature below the solidification temperature is laid on the nozzle plate (10, 26) to overlie the nozzles, said cover defines a space into which a residual melt flows and solidifies to form a plate-like seal of the nozzle apertures (23) while the melt in the nozzles is maintained in a liquid state.

2. Device for carrying out a process for drawing off and blocking off a melt, in particular of plastic material, with a heatable melter (1, 24), which is provided with a blocking valve (3) and acts as a melt distributor and to which is attached a nozzle plate (10, 26), which divides the melt by means of nozzles (14) having nozzle apertures (23) into a plurality of strands and which can be sealed off with an removable cover (18, 30), wherein the nozzle plate (10, 26) and the cover (18, 30) are each provided with a separate and individually controllable heating or cooling system (4, 17, 20, 29, 31) whereby the temperature of each is independently regulated, and wherein the cover (18, 30) includes a recess (19, 32), extending over the nozzle apertures (23) when the cover is closed, as a collecting basin into which a residual melt flows and is cooled and solidified to form a seal of all the nozzle apertures without solidifying the melt in said nozzles.

3. Device, as claimed in claim 2, wherein the cover (18, 30) is provided with a ram (35) penetrating the cover (18, 30) in the region of its recess (19, 23), in order to push out the solidified melt material.

4. Device, as claimed in claim 2, which further includes a temperature insulating layer (12) sealingly connected between the melter (1, 24) and the nozzle plate (10, 26).

* * * * *